US005648432A

United States Patent [19]
Pater et al.

[11] Patent Number: 5,648,432
[45] Date of Patent: Jul. 15, 1997

[54] PROCESS FOR CONTROLLING MORPHOLOGY AND IMPROVING THERMAL-MECHANICAL PERFORMANCE OF HIGH PERFORMANCE INTERPENETRATING AND SEMI-INTERPENETRATING POLYMER NETWORKS

[75] Inventors: Ruth H. Pater, Yorktown, Va.; Marion G. Hansen, Knoxville, Tenn.

[73] Assignee: The United States of America as represented by the Administrator of the National Aeronautics and Space Administration, Washington, D.C.

[21] Appl. No.: 473,605

[22] Filed: Jun. 7, 1995

Related U.S. Application Data

[63] Continuation of Ser. No. 215,792, Mar. 11, 1994, abandoned, which is a continuation-in-part of Ser. No. 679,381, Apr. 2, 1991, abandoned.

[51] Int. Cl.$^6$ .................................................. C08F 283/04
[52] U.S. Cl. .......................... 525/421; 525/422; 525/903
[58] Field of Search ........................... 525/421, 903, 525/422

[56] References Cited

U.S. PATENT DOCUMENTS 5,344,894  9/1994  Lubowitz et al. ................... 525/422
5,460,746  10/1995  Yamamoto et al. .............. 252/183.11

*Primary Examiner*—Ana Woodward
*Attorney, Agent, or Firm*—George F. Helfrich

[57] ABSTRACT

In the process of the present invention, a non-polar, aprotic solvent is removed from an oligomer/polymer solution by freeze-drying in order to produce IPNs and semi-IPNs. By thermally quenching the solution to a solid in a short length of time, the size of the minor constituent-rich regions is greatly reduced as they are excluded along with the major constituent from the regions of crystallizing solvent. The use of this process sequence of controlling phase morphology provides IPNs and semi-IPNs with improved fracture toughness, microcracking resistance, and other physical-mechanical properties as compared to IPNs and semi-IPNs formed when the solvent is evaporated rather than sublimed.

8 Claims, 13 Drawing Sheets

PROCESS FOR CONTROLLING MORPHOLOGY AND IMPROVING THERMAL-MECHANICAL PERFORMANCE OF HIGH PERFORMANCE INTERPENETRATING AND SEMI-INTERPENETRATING POLYMER NETWORKS

CROSS REFERENCE

This is a continuaing application of copending application Ser. No. 08/215,792 filed Mar. 11, 1994, now abandoned which is a continuation-in-part of application Ser. No. 07/679,381, filed Apr. 2, 1991, now abandoned.

ORIGIN OF THE INVENTION

The invention described herein was made jointly by an employee of the United States Government and an employee of the National Research Council and may be used by or for the Government of governmental purposes without the payment of any royalties thereon or therefor.

BACKGROUND OF THE INVENTION

1. Field of the Invention

This invention relates generally to interpenetrating polymer networks (IPNs) and semi-interpenetrating polymer networks (semi-IPNs). It relates particularly to a process for controlling the degree of phase separation and improving toughness, microcracking resistance and thermal-mechanical performance of high temperature IPNs or semi-IPNs.

2. Description of the Related Art

Highly crosslinked polyimides, such as PMR-15 and bismaleimides (BMIs), which are commercially available, are inherently brittle and prone to microcracking in thermally-cycled fiber composites. A successful way to improve the fracture toughness of these materials has long been sought.

One possible method for improving the fracture toughness of highly crosslinked polyimides is similar to the rubber toughening of epoxies. In this method, a tough minor polymer constituent is dispersed in the brittle thermosetting polyimide resin. (C. B. Bucknell, Toughened Plastics, Applied Sci. Pubs., London (1977)). For polyimide fiber composites, however, this approach has a significant drawback. An attractive feature of polyimides is that they have higher glass transition temperatures ($T_g$) than the epoxies they replace. The addition of a minor rubber phase would decrease the $T_g$ and the use temperature of the polymer system, because the lower $T_g$ of a rubber phase is responsible for the material's elevated temperature mechanical properties.

Moreover, a tough neat resin produced by conventional toughening methods is not sufficient for producing a useful tough composite, because of the presence of an additional characteristic dimension when a neat resin is used as the matrix in a composite that is nominally one-third resin and two-thirds fiber. In nonunidirectional composites, the resin is divided into essentially individual volumes of resin divided by fibers. A characteristic dimension for such a volume of material can be defined, which then implies a smaller characteristic dimension for the dispersion of the minor constituent used to toughen the resin on this dimension scale in the composite. Thus, it has been established that the micro-mechanical deformation of the resin in the composite must be altered on a dimensional scale that is much smaller than the diameter of the fiber. Consequently, the morphology of the resin in the composite must be controlled according to this second dimensional constraint. For example, to achieve a toughened BMI by the epoxy method, the nominal size of the dispersed rubber phase will be in the range of two to six microns. If this toughened BMI is used to make a composite that is 60 to 70 percent by volume of fibers that are six to nine microns in diameter, a geometric paradox develops. The fiber volume fraction and fiber diameter impose a morphological constraint on the minor phase of the composite matrix.

It is therefore highly desirable to provide a reliable method of controlling the degree of phase separation and, at the same time, improving the fracture toughness, microcracking resistance and thermal-mechanical performance of a high performance IPN or semi-IPN. To control the morphology, the thermodynamic criterion for the mixing of two or more components is that the free energy of mixing, $\Delta F$ must be negative. The free energy of mixing is the sum of their heat of mixing, $\Delta H$, and the entropy of mixing, $\Delta S$:

$$\Delta F = \Delta H - T \Delta S$$

where T is the absolute temperature of mixing. Since any molecule is more attracted to similar than to dissimilar molecules, $\Delta H$ is usually endothermic and positive when mixing small molecules. The increase in degree of freedom (or $\delta$ randomness) and entropy is very high and can easily outweigh the positive heat of mixing, favoring negative $\Delta F$ and thus miscibility. However, when mixing large polymer molecules, the thousands of atoms in each molecule must remain together, so that mixing cannot be as random and the gain in $\Delta S$ is not nearly as high. Thus, it is seldom possible to outweigh the positive $\Delta H$ and very few pairs of chemically dissimilar polymers are miscible to form a homogeneous, single-phase polymer blend. However, in certain cases, miscibility and homogeneity do occur, as a result of specific interactions between the polymer molecules, such as hydrogen-bonding, dipole-dipole interaction and complex formation.

Besides the thermodynamic parameters, the morphology of a polymer blend comprising two or more chemically dissimilar polymeric components can also be kinetically controlled by a freeze-drying process as described below. Polymers in solutions incessantly change their position randomly by thermal agitation. This Brownian motion dominates time-dependent phenomenon in solutions, such as diffusion: small particles placed in a certain point will spread out in time. This effect of the of Brownian motion can be expressed by the Einstein relation:

$$D = \frac{K_B T}{\zeta}.$$

The Einstein relation states that the diffusion D, which characterizes the thermal motion, is related to the quantity $\zeta$, which specifies the response to the external force. The constant $\zeta$ is the friction constant and its inverse $1/\zeta$ is called the mobility. The degree of phase separation (or diffusion) of particles in a homogeneous solution is directly related to the Brownian motion of the particles. Accordingly, a minimum separation of the particles can be achieved, when the solvent is removed from the solution under a condition where the level of the Brownian motion of the particles is kept at a minimum.

Freeze-drying is a well-known process used in the food industry to preserve of food by rapidly freezing and removing water from food in a frozen state under high vacuum. Such a process has also been used to prepare various polymeric materials. U.S. Pat. Nos. disclosing the use of a freeze-drying process include: 4,845,162 for making a phenolic graft copolymer; 4,302,553 for preparing an IPN; 3,849,350 for providing a low density syntactic foam; 3,812,224 for making, a porous polymeric material; 4,845,162 for preparing a polymer blend and for making 3,702,779 coated paper.

Freeze-drying processing conditions can be varied significantly, depending on cost and performance requirements, the nature of the products and the type of solvents used. The solvents disclosed in the prior-art for the freeze-drying processes include phenol, formic acid, m-cresol, trichloroacetic acid, chlorophenol, dimethylphenol, trifluroethanol, (U.S. Pat. No. 4,845,162). These protic solvents contain relatively mobile protons and readily form hydrogen-bonding with a polyimide, monomeric reactants used in the preparation of the polyimide or an oligomeric precursor of the polyimide and a polyamic acid which is an polymeric precursor of a polyimide. The hydrogen-bonding between the solvent and soluate makes complete solvent removal exceedingly difficult. If the solvent is not completely removed after a freeze-drying step, trace amounts of the residual solvent can lead to several adverse effects during the final stage of curing a high performance polymer blend. One adverse effect is an increase in phase separation of constituent polymeric components due to enhanced fluidity of the polymer melt induced by the residual solvent. Another is a slowdown in the rate of curing, because additional energy is required to break down the solvent-reactants interaction. If the residual solvent still remains after the final stage of curing it can plasticize the product, lowering the $T_g$ and, thus, elevated temperature mechanical performance.

Besides protic solvents, benzene also has been disclosed for use in a freeze drying process (U.S. Pat. Nos. 3,849,350 and 3,812,224). Most high performance polyimides and their monomeric, oligomeric and polymeric precursors are not readily soluble in benzene. Also, benzene is highly toxic (a carcinogen) and its use in laboratory or manufacture plant is severely restricted by OSHA. Accordingly, there is a continuous search in the art for a process that can control the morphology and improve the thermal-mechanical performance of a high performance polymer blend.

It is an object of the present invention to provide a process for simultaneously controlling the morphology and improving the thermal-mechanical properties of a high performance IPN or semi-IPN. Another object of the present invention is to provide a high performance IPN or semi-IPN that exhibits significantly higher $T_g$, elevated temperature mechanical properties and thermo-oxidative stability, compared to the state-of-the-art material. Finally, it is an additional object of the present invention to provide a process for the production of IPNs and semi-IPNs useful as adhesives, moldings, and composite matrices.

SUMMARY OF THE INVENTION

These and other objects are realized by the present invention, one embodiment of which relates to a freeze-drying process capable of simultaneously controlling the morphology and improving the thermal-mechanical performance of a high performance IPN or semi-IPN comprising the following steps: (a) dissolving two or more components, each of which is selected from the group consisting of a high performance polymeric component, monomer reactants used for preparation of the polymeric component and an oligomeric precursor for the polymeric component, in a nonpolar, aprotic solvent capable of forming a weak or no hydrogen-bonding and/or dipole-dipole interaction between the solvent and solute to form a solution; (b) rapidly quenching the solution to form a solid; (c) removing the solvent therefrom by sublimation under a condition whereby the Brownian motion of the solute molecules is at a convenient, experimental minimum, to give a solvent-free mixture; (d) curing the mixture by applying of heat and pressure to form a polymer blend having controlled morphology and improved thermal and mechanical properties. A further embodiment of the invention concerns a method for preparing a much improved molded neat resin article, advanced composite and adhesive by dissolving the reacting consistent components in a non-polar aprotic solvent. The solvent was removed from the constituents by freeze-drying under a condition whereby the level of Brownian motion of the constituents was at a convenient, experimental minimum. In a control experiment, IPNs and semi-IPNs were prepared through a conventional method by dissolving the constituents in a popular solvent. This solvent was removed from the solution by evaporation. The $T_g$s and dynamic mechanical properties for the freeze dried IPNs and semi-IPNs and their graphite fiber reinforced composites were compared to those of the control. In all cases, the results demonstrated that the freeze dried process provided an IPN, semi-IPN or composite which exhibited less phase separation of constituent components, higher $T_g$, better elevated temperature mechanical properties and greater fracture toughness.

DESCRIPTION OF THE PREFERRED EMBODIMENT

Although freeze-drying has been used for many years in food preservation and in preparation of a variety of polymeric materials, including IPNs, it has not been previously disclosed that the freeze-drying process of the present invention would provide a method for both controlling the morphology and improving the thermal-mechanical performance of a high performance IPN, semi-IPN, advanced composite, adhesive, molded neat resin article and tough film.

The present invention is predicated primarily on the unexpected discovery that the combination of using a non-polar aprotic solvent, and removing the solvent when the level of the Brownian motion of the constituent components is at an experimental minimum during freeze-drying provides a new technique for preparation of a high performance IPN or semi-IPN that has a good phase mixing and much improved thermal and mechanical properties. It is believed that the absence of a trace amount of the residual solvent before and after curing the polymeric systems is partially responsible for achieving the objectives of controlling the morphology and improving the thermal-mechanical performance of the high performance polymeric materials. For this reason, it is preferred to use a solvent which is nonpolar (having a low dielectric constant) and aprotic (containing no mobile protons bonded to oxygen, nitrogen or sulfur). Such a solvent is used because of its easy removal. Another important characteristic of the process of the present invention is to remove the solvent under a condition where the level of the Brownian motion of the constituents is at a convenient, experimental minimum, in order to minimize phase separation of the constituent components.

Traditionally, IPNs have been made by finding a common solvent for two different organic constituents and then evaporating the solvent. Popular solvents for the traditional method of preparing high performance polymeric materials include N-methylpyrrolidone (NMP, b.p. 205° C.), N,N-dimethylacetamide (DMAc, b.p. 165° C.), N,N-dimethylforamide (DMF, b.p. 153° C.). While these aprotic solvents readily dissolve most of the reacting components, they have a high boiling point, are highly polar and readily undergo specific interactions, such as hydrogen-bonding, dipole-dipole interaction or complex formation, with the reacting constituents. Consequently, their complete removal is very difficult to achieve.

Figure 1:
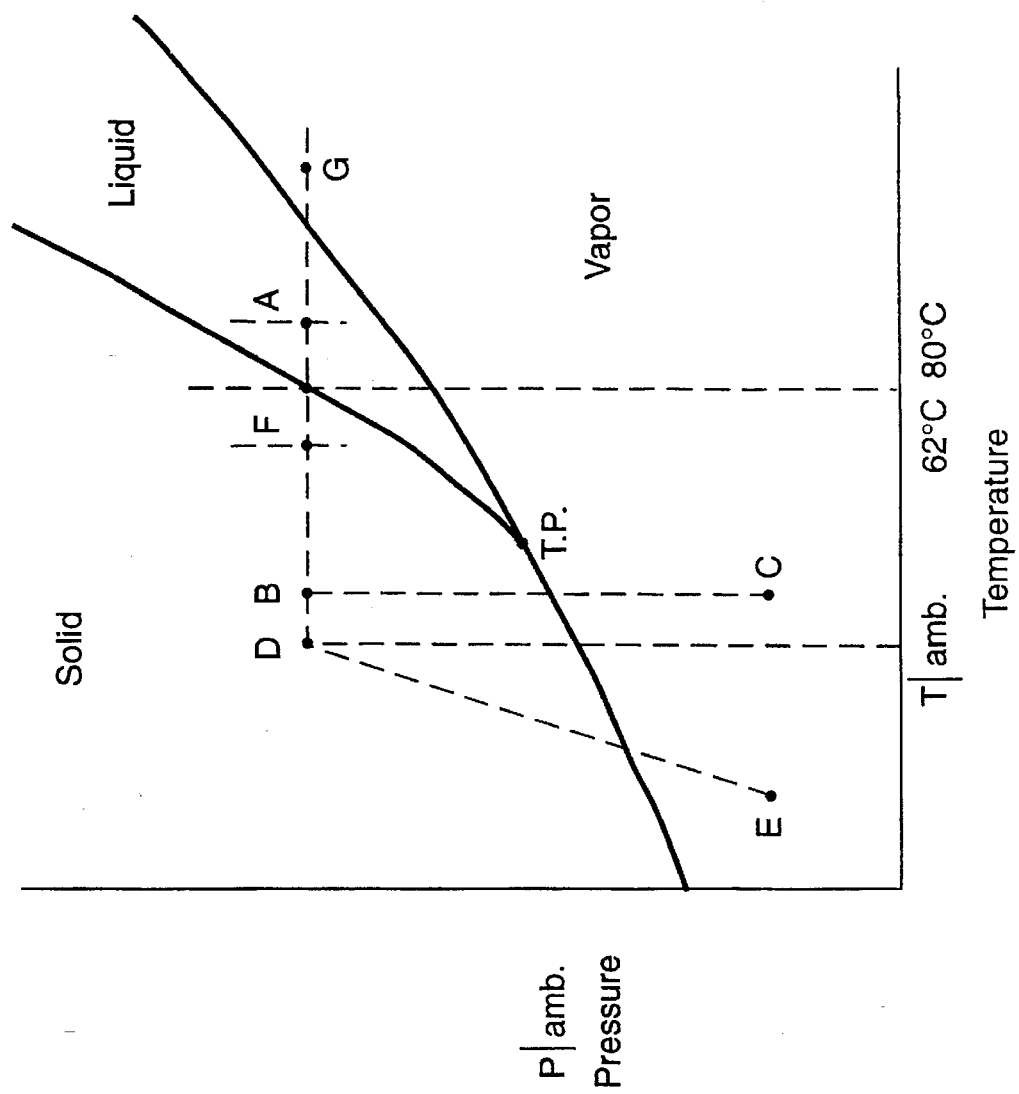
FIG. 1 shows thermodynamic phase diagram for 1,3,4-trioxane.

One or both of these constituents may have reactive endcaps, producing semi-IPNs or full IPNs, respectively. During the evaporation process, the oligomer and polymer components separate due to differences in solubilities as the solution is concentrated. The thermodynamic dependence of a constituent's solubility with solvent removal strongly influences phase separation and thus the morphology of the IPNs. Consider, for example, a solution made of ten to forty percent organic constituents fully dissolved in a solvent to give a liquid phase. The specific thermodynamic phase diagram (temperature, concentration, and pressure) for this solution and the process of removing the solvent influence the size of the minor phase as illustrated in FIG. 1. Traditionally, energy is put into the liquid solution by increasing the temperature of the solution at ambient pressure. This tends to increase the level of Brownian motion in the system and enhance the size of the minor phase that can be produced from the difference in constituent solubilities.

The novel freeze-drying process of the present invention removes the solvent by rapidly removing energy from the liquid. This reduces the level of Brownian motion in the solution and quenches the thermodynamic state of the solution, changing the system to a solid. Specifically, the solution of oligomer and polymer constituents is thermally quenched to a solid in a very short length of time. The thermodynamic state of the two organic constituents in the solid is metastable. The level of phase separation of the two constituents by this process is an experimental minimum. A subambient pressure is applied to the solid and solvent sublimed. A small amount of energy is put into the system to enhance the sublimation process, but the temperature of the solid is kept below the triple-point temperature of the solvent. The remaining solid material is a micro-porous open cell foam of the minimally phase separated constituents.

Figure 2:
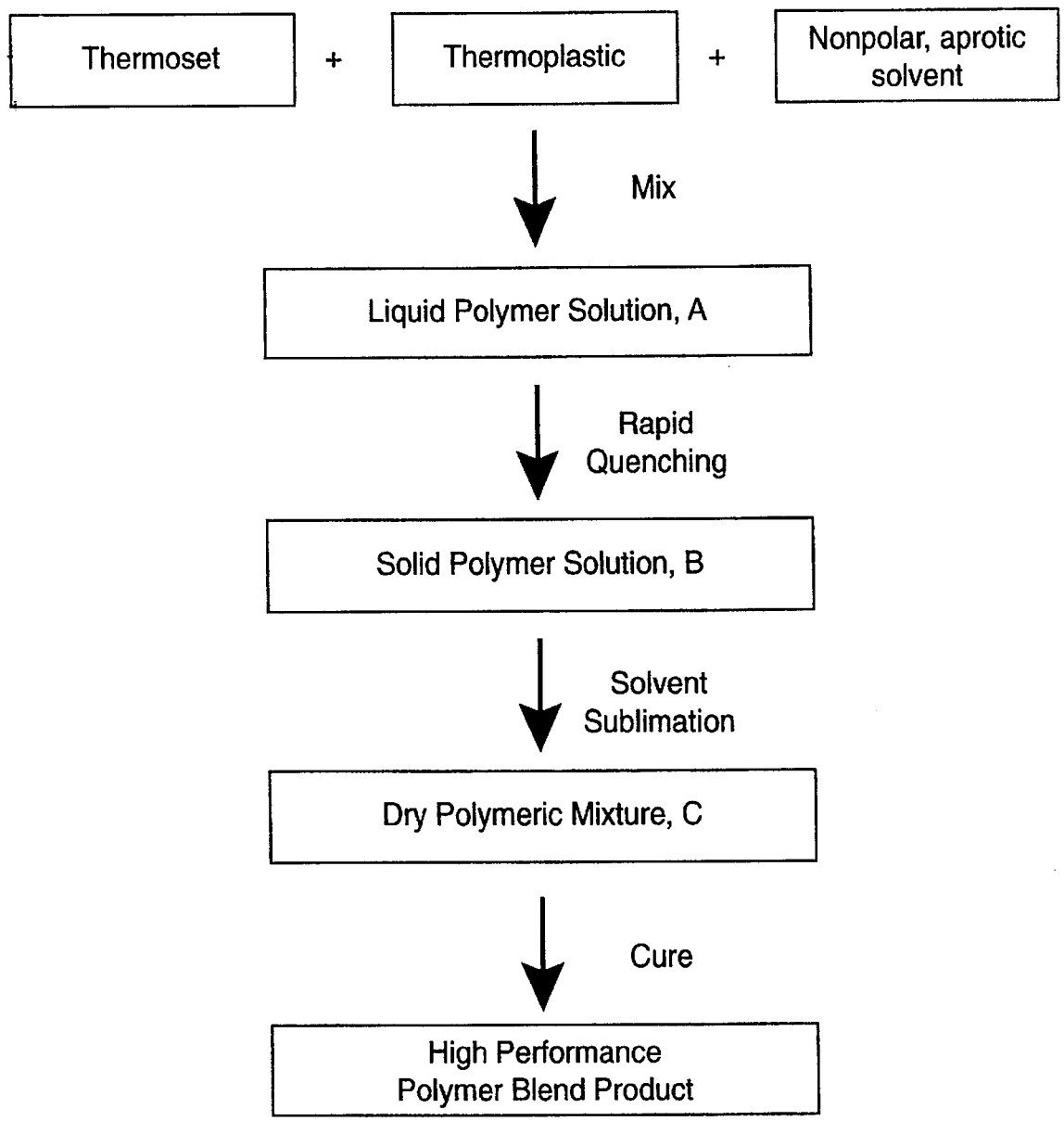
FIG. 2 illustrates a freeze-drying process sequence.

The rapid thermal quenching of the solution to a solid reduces the size of the minor constituent-rich regions that are excluded along with the major constituent from the regions of crystallizing solvent. After the solvent is removed by freeze drying, the organic constituents are left in the physical form of a micro-porous open cell foam as described above. When this material is heated and consolidated, the thermosetting material begins to react and the minor constituent tends to further separate, but this tendency is resisted by the viscous nature of the material and the gelling/crosslinking reaction of the major constituent. The process sequence of controlling polymer morphology, which is illustrated in FIG. 2, is the process of the present invention.

A nonpolar, aprotic solvent suitable for use in the freeze-drying process of the present invention may be either a solid, liquid or gas at ambient temperature and pressure. Such a solvent must be capable of dissolving all reacting constituent components. It is highly desirable that the solvent has a high vapor pressure and can be sublimed (or freeze-dried) at a convenient temperature and pressure. A polymer solution that can be used in existing prepregging equipment and solvent that can be sublimed from graphite fiber prepreg would have a particular advantage. Further, a subsequent B-staged prepreg produces excellent wetting of resin to graphite fibers compared to a control system using a traditional solution processing technique. As an example, crown ether, 1,3,5-trioxane, is an excellent solid solvent for the freeze drying process of the present invention. As will be demonstrated in the Examples below, this solvent is a solid at room temperature (melting point 62° C.) and can easily be sublimed at room temperature under a subambient pressure. It can dissolve both an imide thermoset oligomer and a thermoplastic polyimide in the amic form to give a clear solution upon heating at 60°–80° C. Its hot polymer/oligomer solution can be used in existing prepregging equipment. This solvent can readily be freeze-dried from graphite fiber prepreg to produce a freeze-dried prepreg with excellent wetting of resin to fibers. Examples of liquid solvents suitable for the freeze-drying process of the present invention include 1,2-dichlorobenzene 1,4-dichlorobenzene, 1,4-dioxane, 1,2,4-trichlorobenzene, 1,3,5-trichlorobenzene and tetrahydrofuran. Carbon dioxide ($CO_2$) is a good example of gas solvent suitable for the freeze-drying press of the present invention. At a temperature of −69.9° F. or lower and at ambient pressure, $CO_2$ is a solid. Above −69.9° F., it is a liquid.

A convenient, experimental condition is determined by the nature and amount of the particular material freeze dried, the type and amount of solvent in the frozen material, processing cost and performance of the product required, etc. Initially, it is preferable to remove the solvent from the frozen material at room temperature under high vacuum for a certain time period. After a sufficient amount of the solvent is removed, the temperature of the frozen material is increased to a temperature slightly above an efficient sublimation rate. Sublimation is continued until all or almost all of the solvent is removed to afford a solvent-free or nearly solvent-free mixture.

The freeze-drying process of the present invention has a variety of uses including its use in preparing a composite, adhesive joint, neat resin molded article and tough film. The following examples illustrate how the process of the invention can be used for making a composite, adhesive joint, film and molded resin article. It is to be understood, however, that these examples are merely illustrative and intended to enable those skilled in the art to practice the invention in all of the embodiments flowing therefrom. These examples do not in any way limit the scope of the invention as defined in the appended claims.

EXAMPLE 1

Starting Materials

Figure 3:
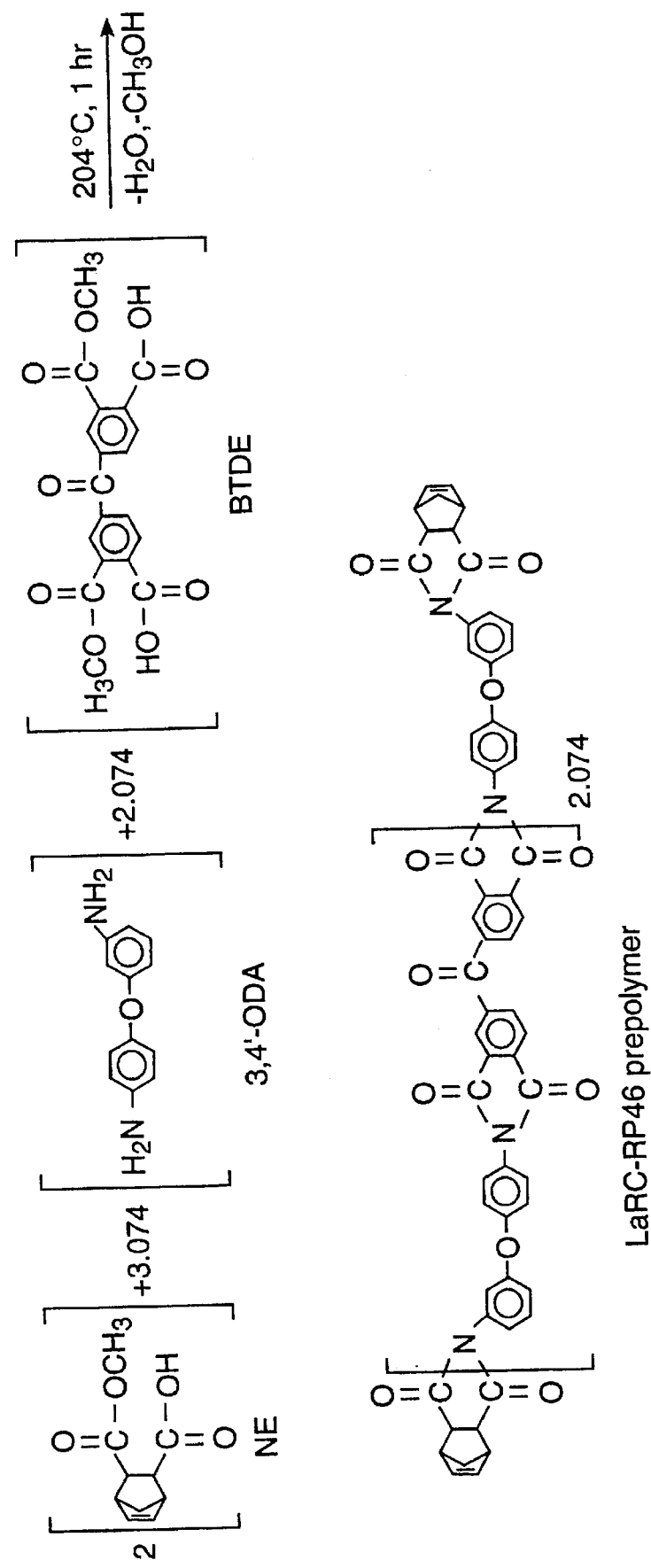
FIG. 3 shows the preparation of LARC -RP46 prepolymer.
Figure 4:
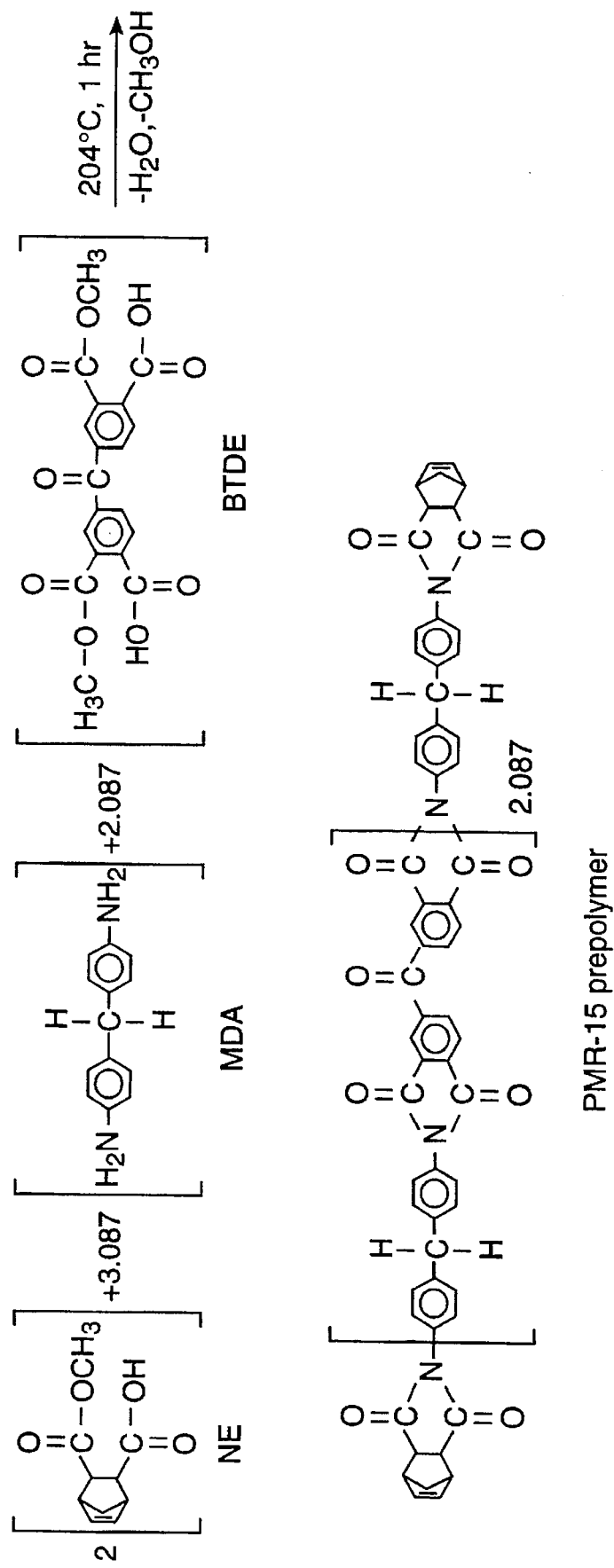
FIG. 4 shows the synthesis of PMR-15 prepolymer.
Figure 5:
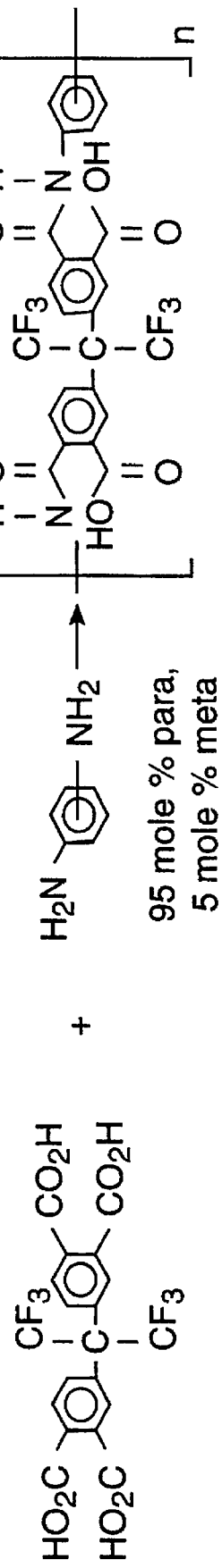
FIG. 5 shows the preparation of NR-150B$_2$ amic acid.

The 5-norbornene-2,3-dicarboxylic anhydride (NA, Kodak), 3,4'-oxydianiline (3,4'-ODA, Kennedy and Klim), 3,3', 4,4'-benzophenonetetracarboxylic dianhydride (BTDA, Allco), 4,4'-methylenedianiline (MDA, Aldrich), 4,4'-diphenylenemethane bismaleimide (MDA-BMI, GCA Chemical Corp.), maleic anhydride (MA, Aldrich), and 3,3'-diaminodiphenylsulfone (3,3'-DDS, Fike) were obtained from the commercial sources as noted and used as received. Monomethyl ester of 5-norbornene-2,3-dicarboxylic acid (NE) and dimethyl ester of 3,3', 4,4'-benzophenonetetracarboxylic acid (BTDE) were prepared by refluxing the corresponding anhydride in methanol for two hours. The NR-150B$_2$ monomer precursor solution in N-methylpyrrolidone (NMP) with 54 weight percent solids was supplied by DuPont. The solvent used in the freeze-drying process was 1,3,5-trioxane purchased from Aldrich. The melting point of 1,3,5-trioxane is 61.5° C., the flash point is 45° C. and the equilibrium vapor pressure at 25° C. under atmospheric pressure is 13 mm-Hg. For the conventional solution method, NMP (from Aldrich), N,N-dimethylacetamide (DMAc) or N,N-dimethylformamide (DMF) was used as the solvent. The boiling point of NMP at atmospheric pressure is 202° C. Unsized Celion 6K graphite fiber tows were purchased from BASF. The preimidized oligomer of LaRC-RP46 was prepared from a 50 weight percent methanol solution containing NE, 3,4'-ODA and BTDE. FIG. 3 shows the preparation of this prepolymer. The molecular weight of this prepolymer was controlled to be about 1500 by using a 2.000:3.087:2.087 molar ratio of NE:3,4'-ODA:BTDE. The methanol solution was concentrated at 70° C. in N$_2$ atmosphere for four hours, and then staged at 150° C. in air for one and one-half hours. This afforded a light brown solid material which was soluble in both 1,3,5-trioxane and NMP. In the same manner, PMR-15 prepolymer was prepared from NE, MDA and BTDE. Again, the molecular weight of PMR-15 oligomer was formulated to be 1500. FIG. 4 shows the preparation of PMR-15 prepolymer. The commercial NR-150B$_2$ monomer-precursers solution was poured into cold distilled water and mechanically blended. The solids were washed with distilled water, filtered and then dried for one hour each at 100° C. and 250° C. to afford brown molding powder. FIG. 5 shows the thermal conversion of the NR-150B$_2$ monomer reactants to the amic acid during the heat treatment.

EXAMPLE 2

LaRC-RP46 Based Simultaneous Semi-IPN

A. Neat Resin Preparation

Figure 6:
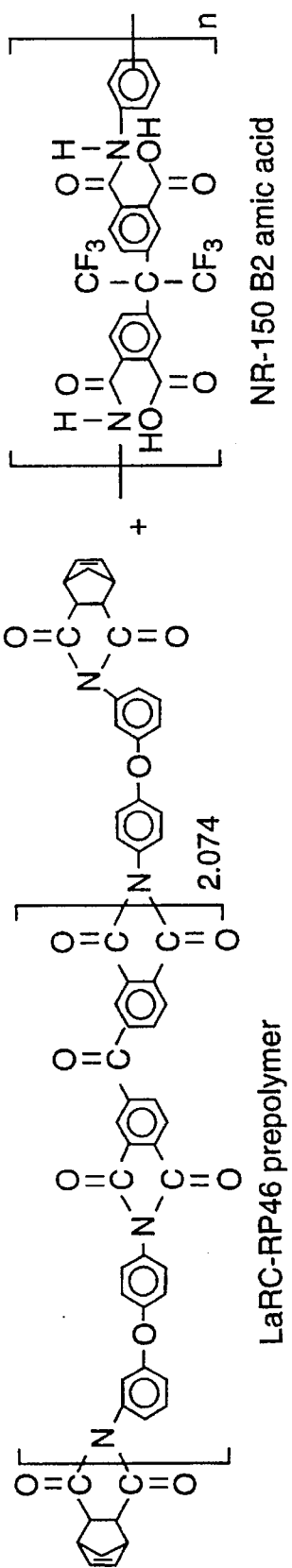
FIG. 6 shows the preparation of a simultaneous Semi-IPN from LARC™-RP46 and NR 150B$_2$ oligomers.
Figure 6:
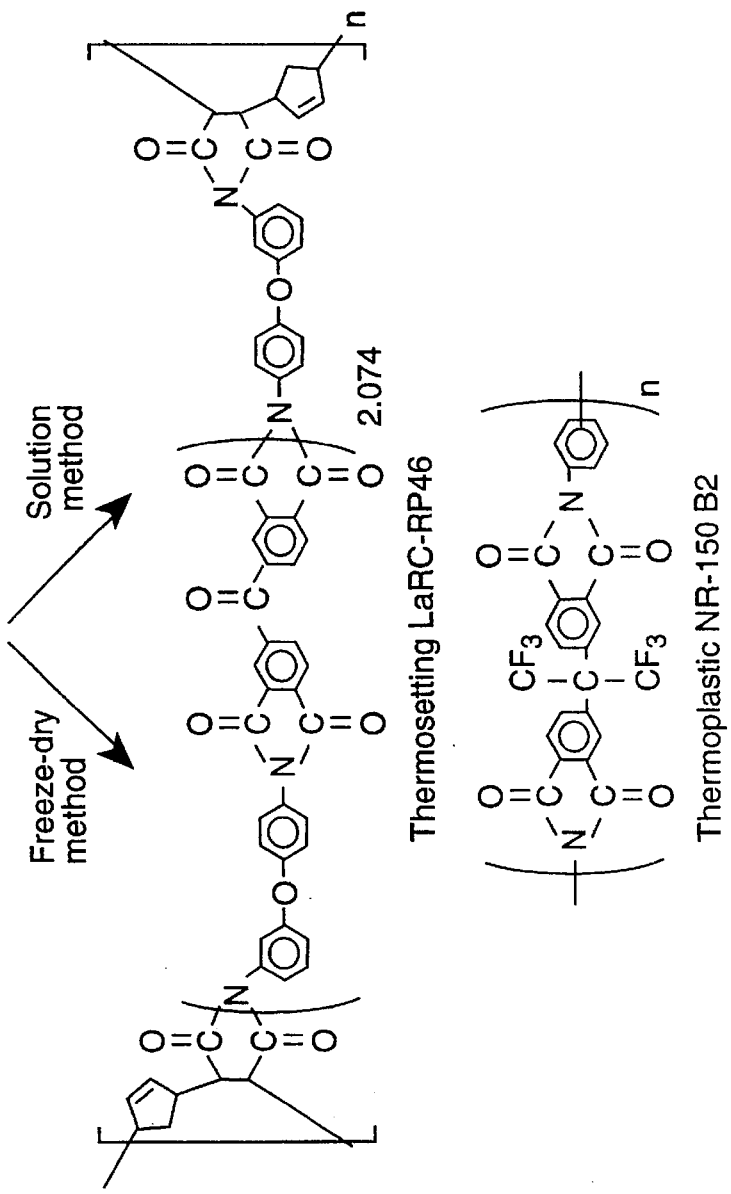

FIGS. 6 shows the preparation of a simultaneous semi-IPN comprising LaRC-RP46 (thermosetting component) and NR-150B$_2$ (thermoplastic phase). In an effort to obtain a favorable balance between processability, toughness and mechanical performance, which are considered to be important properties for aerospace structural applications, the present semi-IPN was formulated to have 75 and 25 weight ratio of LaRC-RP46 to NR-150B$_2$.

A-1. Neat Resin Preparation via Freeze-Drying Process 75 weight percent of LaRC-RP46 prepolymer and 25 weight percent of NR-150B$_2$ molding powder prepared in Example 1 were dissolved in 1,3,5-trioxane at 60° C. and then cast onto a cold glass plate as soon as all constituents had dissolved. This glass plate with solidified material on it was placed in a vacuum (30 mm-Hg) oven to remove the solvent via the freeze-drying process. The oven was held at room temperature for 16 hours and then three hours at 40° C. under vacuum (30 mmHg). The mixture was staged at 204° C. in air for one hour. The freeze-dried powder was cured at 316° C. for one hour, then at 350° C. for one-half hour under 13.8 MPa (2000 psi) pressure. This resulted in an apparently void-free neat resin having a density of 1.35 g/cc.

A-2. Neat Resin Preparation via Solution Method

Reactants of the same composition used in making the freeze-dry processed neat resin described above were dissolved in NMP at 150° C., then concentrated at 160° C. for two hours and at 204° C. for another hour under vacuum (30 mmHg). The cure cycle for solution processed resin was the same as that of freeze-drying processed material.

It is well-known that the morphology of a semi-IPN is closely linked to the fracture toughness of the neat resin. Under a high magnification (5000×) by scanning electron microscopy (SEM), there was no observable phase separation for the present semi-IPN neat resin processed through the freeze-drying method. This phenomenon was expected because during the freeze-drying process, molecular mobility is very limited, unlike in a solution method. This greatly reduces the early stage phase separation. A well-mixed phase morphology can lead to good resin fracture toughness. This seems to be the case from the rough surface morphology of the fractured resin. The T$_g$ of the present semi-IPN neat resin, taken at the tan δ peak temperature, was 320° C. This is 44° C. higher than the T$_g$ of the neat resin prepared by the solution method using an identical processing cycle. Also, the damping peak for the freeze-dry-processed material was somewhat sharper than that of the solution-method-prepared counterpart. This suggests that the freeze-dry-processed neat resin has less phase separation than the solution-method-prepared material. To account for the significantly higher T$_g$ for the freeze-dry-processed material over the solution-method-prepared counterpart, which may be due to the difference in their chemical structures resulting from the reaction of the resin with the residual solvent (1,3,5-trioxane), a FTIR study was initiated. The results show that both of the neat resins prepared by the freeze-drying and solution processes had an identical FTIR spectrum, indicating that they have the same polymer structure. The TGA study showed that the neat resin prepared by the freeze-dry process had a 5 percent weight loss at 457° C., compared to 439° C. for the solution prepared material.

B. Composite Fabrication

B-1. Composite Fabrication via Freeze-Drying Process

Reactants with the same composition used in making neat resin were dissolved in hot trioxane to give a solution containing 30% (by weight) resin solids. This solution was then poured into the sample holder (preheated to 90° C.) of a prepreg machine. Prepreg was prepared by drum winding unsized Celion 6000 graphite yarn. After solidification on the drum of the machine, the prepreg was removed from the drum, cut into 7.6 cm by 15.3 cm plies and dried in a vacuum oven at room temperature for 12 hours, 50° C. for seven hours, then 120° C. for two hours. A 12-ply unidirectional composite panel was compression molded using the following cure cycle: 316° C. for one hour and 350° C. for one-half hour under 5.2 MPa pressure. The cured composite panel was postcured at 316° C. for 16 hours in air.

List of Nomenclature

| Acronym | Name |
|---|---|
| BMI | bismaleimide |
| BTDA | 3,3',4,4'-benzophenonetetracarboxyloic dianhydride |
| BTDE | dimethyl ester of 3,3',4,4'-benzophenonetetracarboxylic acid |
| 3,3'-DDS | 3,3'-diaminodiphenylsulfone |
| 3,3'-DDS BMI | 3,3'-diphenylsulfone bismaleimide |
| MDA BMI | 4,4'-diphenylenemethane bismaleimide |
| NA | 5-norbornene-2,3-dicarboxylic anhydride |
| NE | Monomethyl ester of 5-norbornene-2,3-dicarboxylic acid |
| MA | maleic anhydride |
| 3,4'-ODA | 3,4'-oxydianiline |
| MDA | 4,4'-methylenedianiline |
| $PISO_2$ | polyimidesulfone |
| $PISO_2$ BMI | bismaleimide from $PISO_2$ and MA |
| DMAc | N,N-dimethylacetamide |
| NMP | N-methylpyrrolidone |
| DMF | N,N-dimethylformamide |
| IPN | Interpenetrating polymer network |
| Semi-IPN | Semi interpenetrating polymer network |
| $T_g$ | glass transition temperature |
| TGA | thermogravimetric analysis |
| TMA | thermomechanical analysis |
| SEM | scanning electron microscopy |

B-2. Composite Fabrication via Solution Method

A 30 weight percent NMP solution having the same composition used in making neat resin was used to drum wind unsized Celion 6000 graphite fibers at room temperature. The prepreg was dried on the rotating drum at room temperature for 16 hours and then removed from the drum, cut into 7.6 cm by 15.3 cm plies. Twelve plies were stacked unidirectionally and staged at 204° C. for one hour in an air-circulating oven. The cure cycle for solution processed composite was the same as that for the freeze-drying processed laminate.

The apparent $T_g$s were determined by Thermal Mechanical Analyzer (TMA) at a heating rate of 5° C./min. Flexural tests of the composites were performed in accordance with ASTM D790. Interlaminar shear strengths were measured following ASTM D2344 specifications. Each value reported for flexural and interlaminar shear properties was an average of three determinations. The fiber and resin volume percents were determined by the $H_2O_2/H_2SO_4$ digestion method per ASTM D-3171. The composite dynamic shear measurements were recorded on a Rheometrics System 4 spectrometer. Rectangular unidirectional composite specimens having a length of 45.2 mm, width of 12.7 mm, and thickness varying from 2.0 to 3.0 mm with the fiber axis parallel to the specimen length were subjected to forced torsional oscillations. The specimen was clamped to the fixtures in the chamber and the temperature of the chamber was allowed to equilibrate around 30° C. The measurements were made at a maximum strain of 0.1 percent and constant frequency of 1 Hz using a temperature sweep mode. The temperature of the specimen was raised from 30° C. to 450°±2° C. at a heating rate of 2° C./minute. The storage modulus (G'), loss modulus (G"), and loss tangent (tan δ) were recorded and plotted against temperature at each 4° C. interval. Table 1 compares the unidirectional composite properties of Celion 6K/semi-IPN of LaRC-RP46 and NR-150B$_2$ fabricated by the freeze-dry and solution processes. Like the neat resin, the composite fabricated by the freeze-dry process had a higher $T_g$ compared to the material prepared via the solution method (301° C. vs. 293° C.) determined by TMA. Based on the results of C-scan and acid digestion, a high quality composite was obtained by both processes. The mechanical properties of the freeze-dry-processed composite compared favorably to those of the solution-method-fabricated material. The values of the mechanical properties listed in Table 1 are low, however. This is primarily due to low fiber content (44 and 39 volume percents). The composite by the freeze-drying process exhibited 100 percent retention of 316° C. interlaminar shear properties after aging 500 hours at 316° C. in air, indicating that this material had reasonably good thermo-oxidative stability. This is confirmed by the small weight loss (2.2%) induced by the 500 hours aging at 316° C. In agreement with the TMA results mentioned above, the rheometric dynamic test data for these composite systems showed that the composite prepared by the freeze-dry process had a higher $T_g$ than the counterpart prepared by the solution method. The dynamic data also showed that the composite prepared by the freeze-dry process had less phase separation than the laminate prepared by the solution method, confirming the results of the neat resin study discussed earlier. The $T_g$ increased substantially and the extent of phase separation decreased notably, when the composite was aged for 500 hours at 316° C. in air.

TABLE 1

Unidirectional Composite Properties of
LaRC-RP46/NR-150B$_2$ Semi-IPN (Example 2)

| Property | Freeze-Drying Processed | Solution Processed |
|---|---|---|
| Tg, °C. | 301 | 293 |
| Volume % | | |
| Fiber | 44 | 39 |
| Resin | 56 | 60 |
| Void | 0.3 | 0.9 |
| C-scan | excellent | excellent |
| Flexural strength, MPa/Ksi | | |
| 25° C. | 710/103 | 731/106 |
| 316° C. | 524/76 | 365/53 |
| Flexural Modulus, GPa/Msi | | |
| 25° C. | 51/7.4 | 46/6.6 |
| 316° C. | 35/5.1 | 14/2.0 |
| Interlaminar shear strength, MPa/ksi | | |
| 25° C. | 58/8.4 | 57/8.2 |
| 316° C. | 33/4.7 | 36/5.2 |
| After aging 500 hours at 316° C. in air: | | |
| Interlaminar shear strength, MPa/ksi 316° C. | 33/4.8 | — |
| Weight loss, % | 2.2 | 2.0 |

On the basis of these results, it can be concluded that the $T_g$ is higher and extent of minor constituent phase separation is less in the freeze-dry-processed neat resin and composites than for the solution processed materials. The removal of solvent by polymer solution solidification and sublimation greatly retards constituent separation. Furthermore, no solvent is present at higher temperature to plasticize the resin or produce voids. Thus, the freeze-dry process produces improved properties in both neat resins and composites.

EXAMPLE 3

PMR-15 Based Simultaneous Semi-IPN

Figure 7:
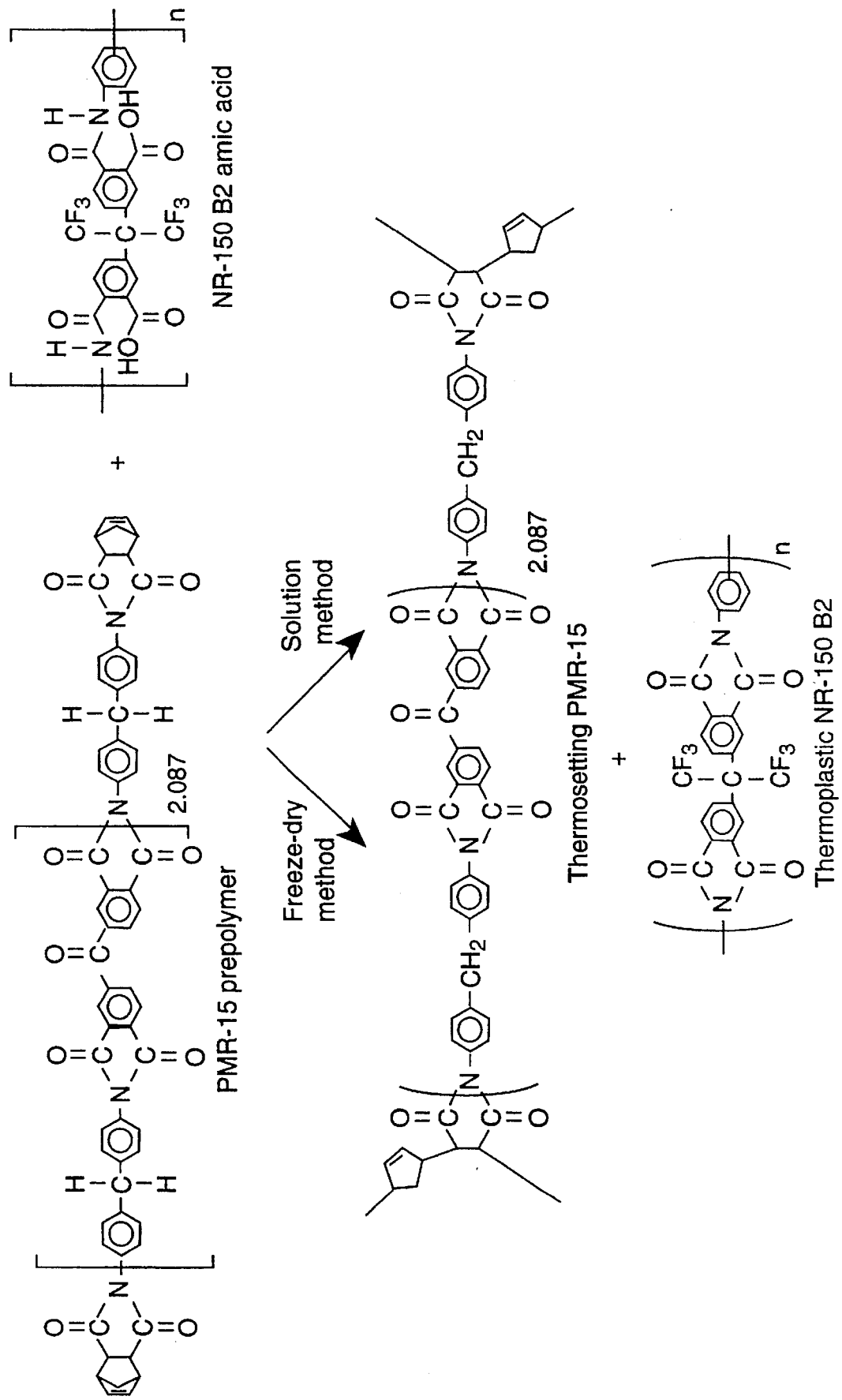
FIG. 7 shows the preparation of LARC™-RP40 Comprising PMR-15 and NR-150B$_2$.

As in Example 2, a simultaneous semi-IPN was also prepared from PMR-15 prepolymer and NR-150B$_2$ molding powder in 75 and 25 weight ratio. FIG. 7 shows the synthesis of this semi-IPN which has been designated LaRC-RP40. As in Example 2, neat resins and Celion 6K graphite fiber reinforced composites were also fabricated via both freeze-drying and solution methods. Tables 2 and 3 compare the neat resin and composite properties of this semi-IPN. TMA showed that the freeze-drying-processed neat resin had a single $T_g$ at 336° C., whereas the solution-method-prepared sample had two well-separated thermal transition peaks to 325° C. and 390° C. (Table 2). The peak at 325° C. was most likely due to a $T_g$, while the higher temperature transition at 390° C. was associated with melting of NR-150B$_2$ crystals ($T_m$). Optical microscopic examination showed large particles with sizes ranging from 50 to 100 microns (NR-150B$_2$ component) embedded in a continuous phase (PMR-15 phase). In sharp contrast, the freeze-dry processed material showed no observable phase separation. This is consistent with the above TMA results which showed a single $T_g$ for the freeze-dried sample and two well-separated thermal transitions for the solution-method-processed material.

TABLE 2

Neat Resin Properties of LaRC-RP40 (Example 3)

| Property | Freeze-Drying Processed | Solution Processed |
| --- | --- | --- |
| Tg, °C. | 336 | 325,390 |
| Density, g/cc | 1.34 | 1.31 |
| TGA Temperature at 5% weight loss, °C. | 485 | 463 |
| Weight Loss after 15 hpurs at 316° C. in air, % | 1.8 | 2.0 |

Two important factors must be considered in comparing the composite properties listed in Table 3. First, the freeze-drying-processed composite did not undergo postcuring, while the solution-method-fabricated panel was postcured for 16 hours at 316° C. in air, prior to the thermal and mechanical testings. Such a postcuring treatment has been shown to significantly affect the $T_g$ and elevated temperature mechanical properties of a PMR type polyimide (for example, PMR-15). Secondly, there was a large difference in the fiber volume fraction between these two materials (40 vs. 78%), making a comparison of the mechanical properties difficult and, even meaningless.

TABLE 3

Unidirectional Composite Properties of LaRC-RP40 (Example 3)

| Property | Freeze-Drying Processed | Solution Processed |
| --- | --- | --- |
| Tg, °C. | 355 | 369 |
| Density, g/cc Volume % | 1.49 | 1.55 |
| Fiber | 40 | 78 |
| Resin | 55 | 17 |
| Void | 5 | 5 |
| C-scan | good | good |
| Flexural strength, MPa/Ksi[a] | | |
| 25° | 1213/176 | 1413/205 |
| 316° C. | 903/131 | 924/134 |
| Flexural Modulus, GPa/Msi[a] | | |
| 25° C. | 95/13.7 | 117/17.0 |
| 316° C. | 76/11.0 | 107/15.5 |

TABLE 3-continued

Unidirectional Composite Properties of LaRC-RP40 (Example 3)

| Property | Freeze-Drying Processed | Solution Processed |
| --- | --- | --- |
| Interlaminar shear strength, MPa/ksi | | |
| 25° C. | 57/8.3 | 98/14.2 |
| 316° C. | 35/5.1 | 48/6.9 |

[a]The values for flexural strength and modulus have been normalized to 60 volume % fiber.

EXAMPLE 4

Bismaleimide Based Semi-2-IPN

Figure 8:
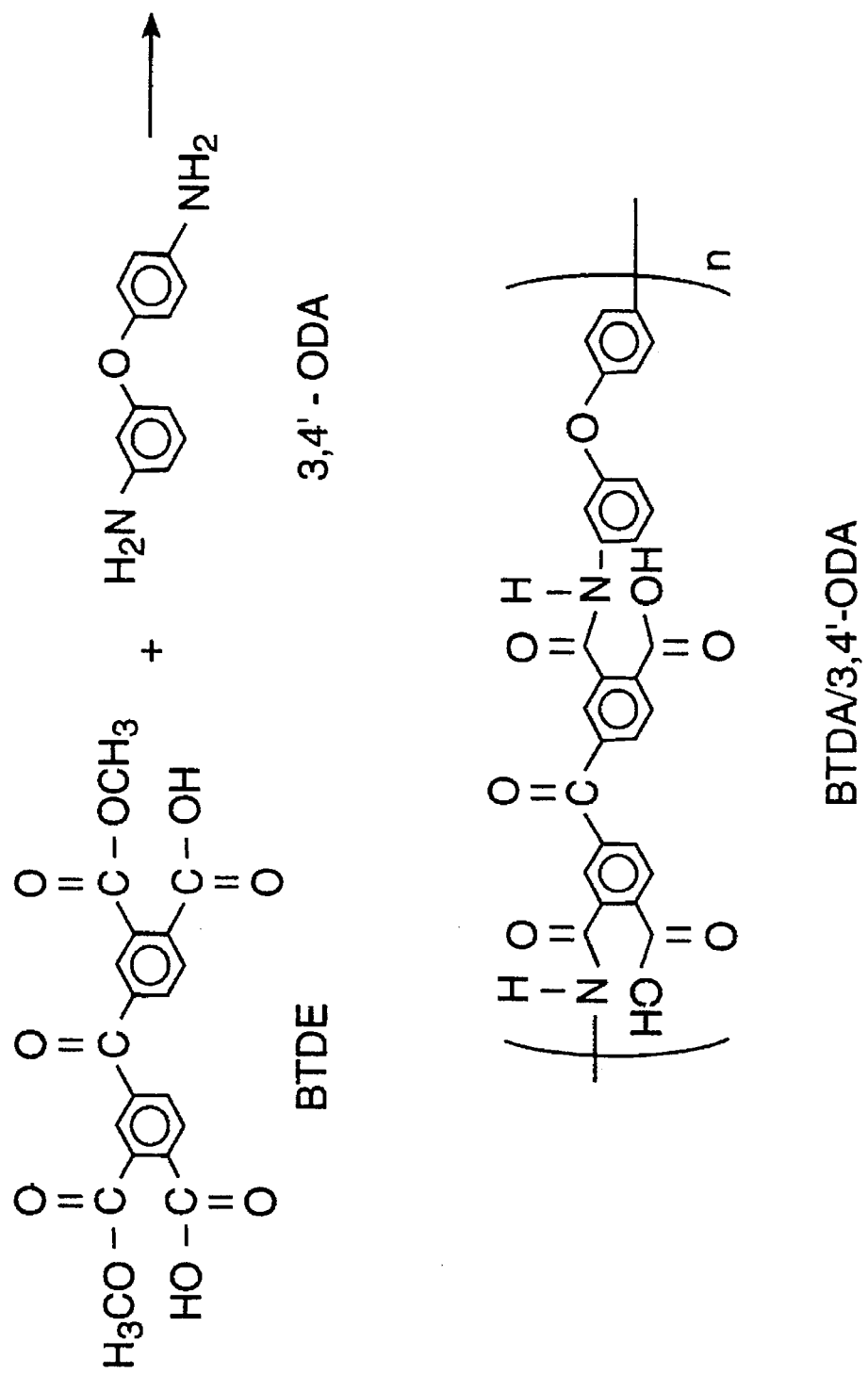
FIG. 8 shows the synthesis of BTDE/3,4'-ODA linear thermoplastic amic acid.
Figure 9:
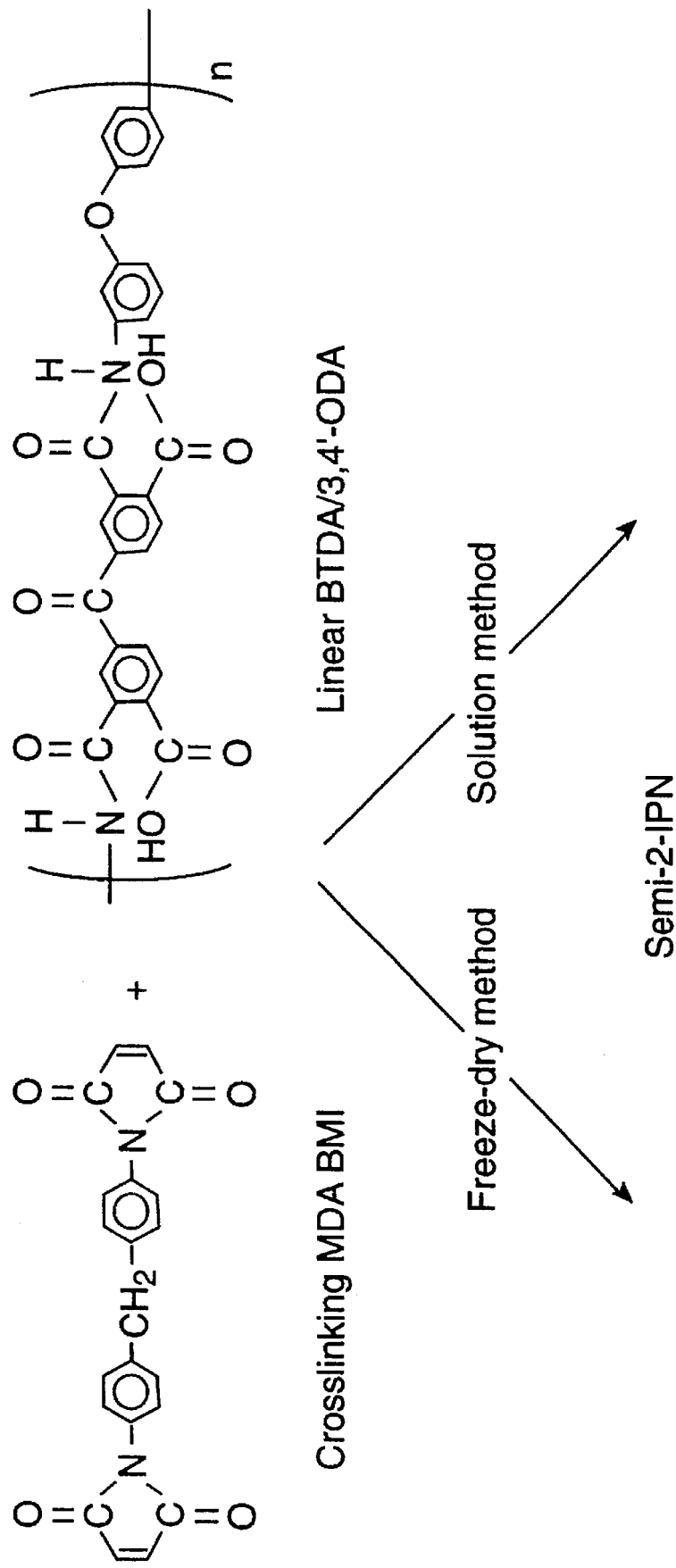
FIG. 9 shows the preparation of a semi-2-IPN from MDA BMI oligomer and linear BTDE/3,4'-ODA amic acid.

In this semi-IPN, the thermosetting component is the commercially available bismaleimide, 4,4'-diphenylenemethane bismaleimide (MDA/BMI). The thermoplastic phase was a new polymer prepared from BTDE and 3,4'-ODA where 3,4'-ODA was 2% mole over BTDE. While FIG. 8 shows the synthesis of the thermoplastic presursor in the form of a polyamic acid, FIG. 9 shows the preparation of this semi-2-IPN.

A. Neat Resin Preparation

A-1. Neat Resin Preparation via Freeze-Drying Process

BTDE (6.4 g, 0.0166 mole) and 3,4'-ODA (3.4 g, 0.0170 mole) were dissolved in 39.2 g of hot trioxane. After stirring at 90° C. for 30 minutes, 29.4 g of MDA BMI powder was added. As soon as all constituents had dissolved, the hot solution was cast onto a cold plate. The freeze-drying process of Example 2 was applied to remove the solvent from the constituents. The freeze-dried powder was further staged at 150° C. for one hour in air and was then cured at 250° C. for one hour, and at 316° C. for one hour under 2000 psi pressure.

A-2. Neat Resin Preparation via Solution Method

BTDA(45.6 g, 0.1416 mole) and 3,4'-ODA (28.4 g, 0.1420 mole) were dissolved in DMAc(172.5 g) and they were allowed to react at room temperature overnight to yield a brown solution, which contained about 30 weight percent solid concentration of BTDA/3,4'-ODA thermoplastic amic acid precursor. About 16.7 g of this solution was added to MDA BMI (15.0 g) in DMAc(18.3 g). The mixture was stirred at room temperature for one hour and the resultant solution was concentrated at 140° C. for three hours under vacuum (30 mmHg). The dried material was further staged at 150° C. for one hour in air and then cured, using the processing conditions of the freeze-dried neat resin described previously.

The freeze-dry processed resin showed a single $T_g$ by TMA and confirmed by DMA. Also, SEM showed no observable phase separation under a high magnification (5000×). The TGA study showed that 5% weight loss occurred at 417° C.

B. Composite Fabrication

B-1. Composite Fabrication via Freeze-Drying

As in Example 4 A-1 for the neat resin preparation via freeze-drying process, 75% by weight MDA BMI and 25% by weight BTDE/3,4'-ODA were dissolved in hot trioxane to give a solution containing 30 weight percent resin solids. This hot solution was used to prepare a prepreg tape which was freeze-dried using the same processing conditions described in Example 2 B-1. A 12-ply unidirectional composite laminate was then made from freeze-dried prepregs. The composite was compression molded using the cure cycle: one hour at 250° C. followed by one hour at 316° C. under 3.45 MPa (500 psi) pressure. The cured panel was postcured at 288° C. for four hours in air and then tested.

B-2. Composite Fabrication via Solution Method

MDA BMI (45.0 g), the thermoplastic amic acid solution (50.0 g) prepared in Example 4 A-2 and DMAc (105.0 g) were stirred at room temperature for one-half hour. The resultant solution was used to impregnate unsized Celion 6K graphite fibers. The prepreg tape was dried at 150° C. for one hour in air. A 12-ply unidirectional laminate was compression molded using the cure-cycle of the freeze-dry processed composite described above.

Table 4 shows the unidirectional composite properties of this semi-IPN matrix resin prepared via the freeze-drying and solution processes. As evident from Table 4, the freeze-drying process produced a substantially improved composite system than the solution method under identical processing and testing conditions. Not only did the $T_g$ but also the mechanical properties tested at room temperature and 232° C. were significantly higher for the freeze-dried material than for the solution processed sample. The 232° C. interlaminar shear strength actually increased, rather than decreased as might be expected, after aging at 232° C. for 500 hours in air, indicating that the freeze-drying-processed composite system had good thermo-oxidative stability. The increase in the mechanical property also suggests that the crosslinking of the BMI component was not completed and further crosslinking took place when energy was available.

TABLE 4

Unidirectional Composite Properties of BMI Based Semi-1-IPN (Example 4)

| Property | Freeze-Drying Processed | Solution Processed |
| --- | --- | --- |
| Tg, °C. | 293 | 285 |
| Flexural Strength, MPa | | |
| Room Temperature | 462 | 237 |
| 232° C. | 358 | 145 |
| Flexural Modulus, GPa | | |
| Room Temperature | 62 | 51 |
| 232° C. | 70 | 49 |
| Interlaminar Shear Strength, MPa | | |
| Room Temperature | 19 | 18 |
| 232° C. | 20 | 11 |
| Aged (232° C. 500 hour) and tested at 232° C. | 23 | — |

EXAMPLE 5

BMI Based Semi-2-IPN

A. Neat Resin Preparation

Figure 10:
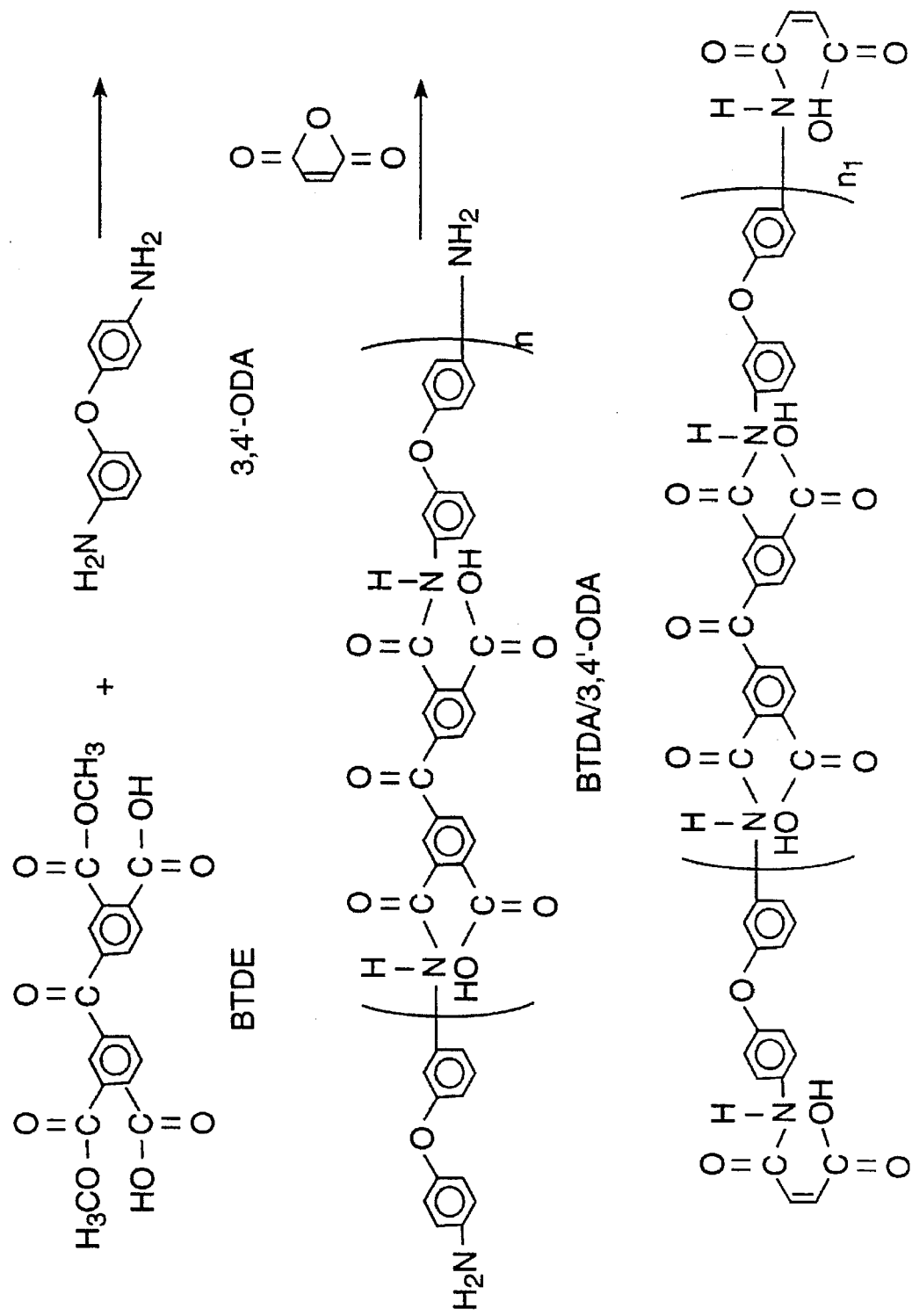
FIG. 10 shows the preparation of a bismaleimide amic acid.
Figure 11:
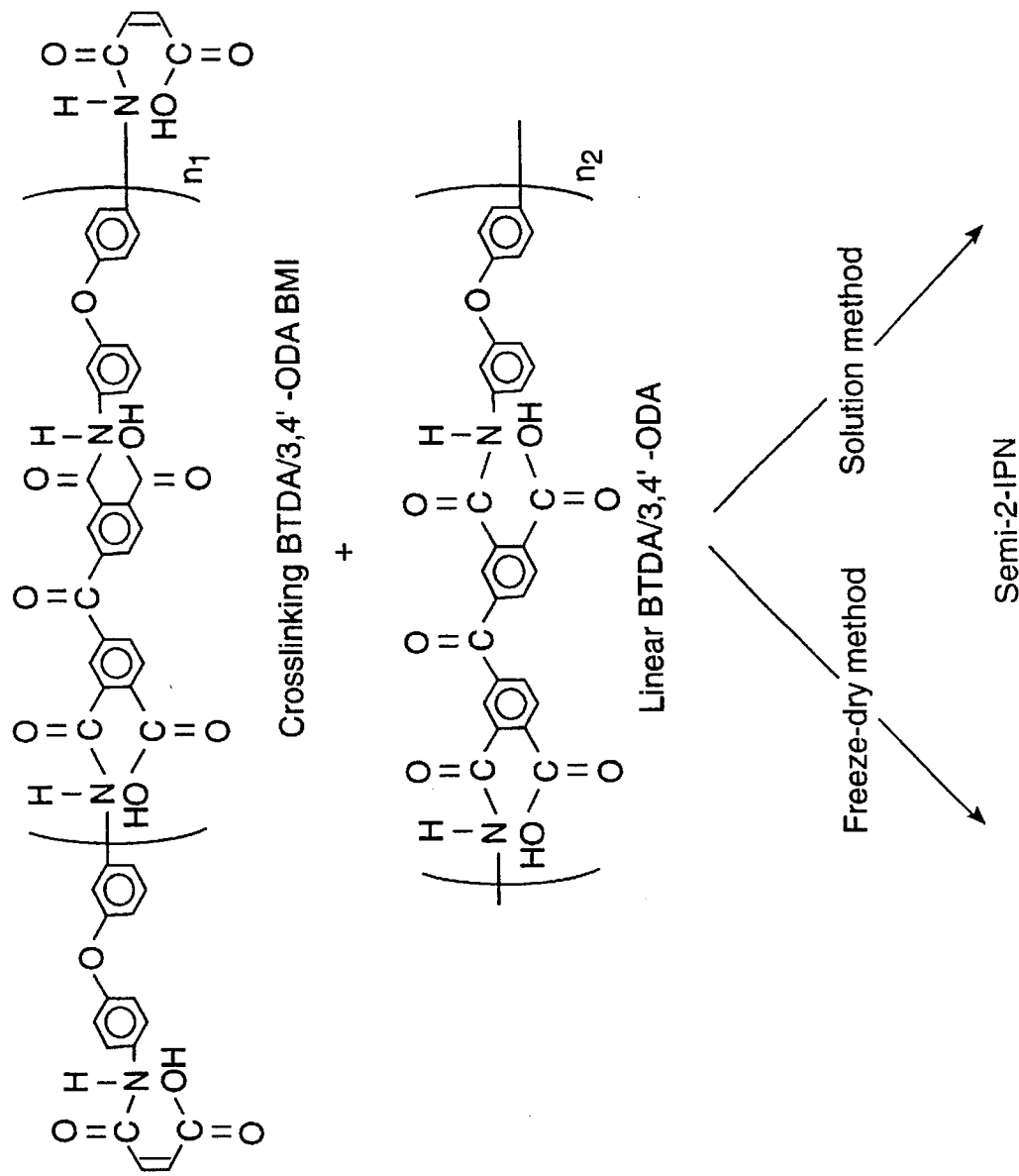
FIG. 11 shows the synthesis of a semi-2-IPN from a new BMI and linear BTDE/3,4'-ODA amic acid.

A chemically compatible semi-IPN, in which the thermosetting and thermoplastic components have the same repeating unit, was synthesized from the thermoplastic used in making the semi-IPN of Example 4 and a new bismaleimide (BMI). The BMI amic acid precursor was prepared from BTDE, 3,4'-ODA and MA, according to the synthetic scheme shown in FIG. 10. This BMI amic acid precursor was then allowed to imidize and crosslink in the immediate presence of the thermoplastic amic acid which is also undergoing imidization and chain extension to produce a sequencial semi-2-IPN. FIG. 11 illustration the synthesis of this semi-IPN.

A-1. Neat Resin Preparation via Freeze-Drying Process

BTDE (14.7 g, 0.038 mole) and 3,4'-ODA (11.2 g, 0.056 mole) were dissolved in hot 1,3,5-trioxane (45.0 g) and they were allowed to react at 90° C. for 30 minutes. Maleic anhydride (3.5 g, 0.036 mole) was then added to this solution. The mixture was simmered at 90° C. for 15 minutes. In a separate beaker, BTDE (6.4 g, 0.0166 mole) and 3,4'-ODA (3,4 g, 0.0170 mole) were dissolved in 20.0 g of 1,3,5-trioxane preheated to 60° C. and the solution was stirred at 90° C. for 30 minutes. The hot solution containing the bismaleimide amic acid precursor was then combined with that of the thermoplastic amic acid precursor. After stirring at 105° C. for 5 minutes, the mixture was cast onto a cold glass plate.

The freeze-drying process took 13 hours at room temperature and 2 hours at 50° C. under vacuum. The mixture was then B-staged in an air circulated oven for 1 hour at 145° C. The freeze-dried powder was cured at 316° C. for 1 hour and 371° C. for 0.5 hour under 4000 psi. One piece of the cured resin was put back into a mold for reprocessing at 400° C. for 0.5 hour. The $T_g$ read from TMA for this resin was 283° C. and 5% weight loss occurred at 446° C. by TGA. After reprocessed at 400° C., the $T_g$ increased greatly. This might suggest the crosslinking of the BMI monomers was blocked by the thermoplastic part of this IPN. The dynamic cure study showed that storage and loss moduli started to drop around 270° C., close to $T_g$ before the resin was reprocessed, but both of them rose again later on. This might also suggest that further crosslinking of the thermoset part of the resin, which is blocked by the thermoplastic phase due to insufficient molecular motion at a certain reaction temperature, would take place at this higher temperature where molecules move more freely than at low temperature. Again, there was no detectable weight loss measured by TGA due to trioxane retention in the resin system.

A-2. Neat Resin Preparation via Solution Method 3,4'-ODA (11.2 g, 0.056 mole) and BTDA (12.2 g, 0.038 mole) were dissolved into DMAc (62.2 g) at room temperature. After stirring for 20 minutes, MA (3.5 g, 0.036 mole) was added to form the bismaleimide amic acid precursor. This bismaleimide amic acid (75% by weight) was poured into the thermoplastic amic acid (25% by weight) prepared in Example 4 A-2 and the mixed solution was dried at 130° C. under vacuum (30 mmHg) for 3 hours. The cure cycle for solution-processed resin was same as that of freeze-drying-processed resins. This yielded a black resin which had a density of 1.32 g/cc and two $T_g$s at 224° C. and 280° C. by TMA and confirmed by DSC. The pressence of two widely separated (56° C.) $T_g$s suggests a grossly separated two-phase morphology for the solution-processed neat resin. This is in striking contrast with a well-mixed phase morphology seen in the freeze-drying processed counterpart described in Example 5 A-1.

B. Laminate Fabrication

B-1. Laminate Fabrication via Freeze-Drying Process

As in Example 5 A-1, the same bismaleimide amic acid precursor (60% by weight) was mixed with thermoplastic amic acid precursor (40% by weight). Additional trioxane solvent was added to afford a solution containing 20% by weight resin solids. This solution was then used to make a prepreg tape which was then freeze-dried as in Example 2

B-1. A 12-ply unidirectional composite was made from the freeze-dried prepregs. The composite fabrication process was the same as that described in Example 4 B-1.

B-2. Laminate Fabrication via solution Method

As in Example 5 A-2, the bismaleimide amic acid precursor (60% by weight) and the thermoplastic amic acid precursor (40% by weight) in DMAc were used to prepare a prepreg tape which was dried and then compression molded into a unidirectional laminate, using the same processing conditions as described in Example 4 B-2.

From comparing the sharpness of the damping peak in the tan δ-temperature curve, the magnitude of minor constituent separation was significantly less in the freeze-drying processed composite material, compared to the solution processed counterpart. The data of Table 5 also indicate that the $T_g$ and mechanical properties are higher in the freeze-drying processed material than for the solution processed counterpart.

TABLE 5

Unidirectional Composite Properties of BMI Based Semi-2-IPN (Example 5)

| Property | System II | |
|---|---|---|
| | Freeze-Drying Processed | Solution Processed |
| Tg, °C. | 292 | 255 |
| Flexural Strength, MPa | | |
| Room Temperature | 407 | 179 |
| 232° C. | 283 | 166 |
| Flexural Modulus, GPa | | |
| Room Temperature | 24 | 19 |
| 232° C. | 17 | 35 |
| Interlaminar Shear Strength, MPa | | |
| Room Temperature | 43 | 24 |
| 232° C. | 33 | 26 |
| Aged (232° C. 500 hour) and tested at 232° C. | 37 | — |

EXAMPLE 6

BMI Based Full IPN:

A. Neat Resin Preparation

Figure 12:
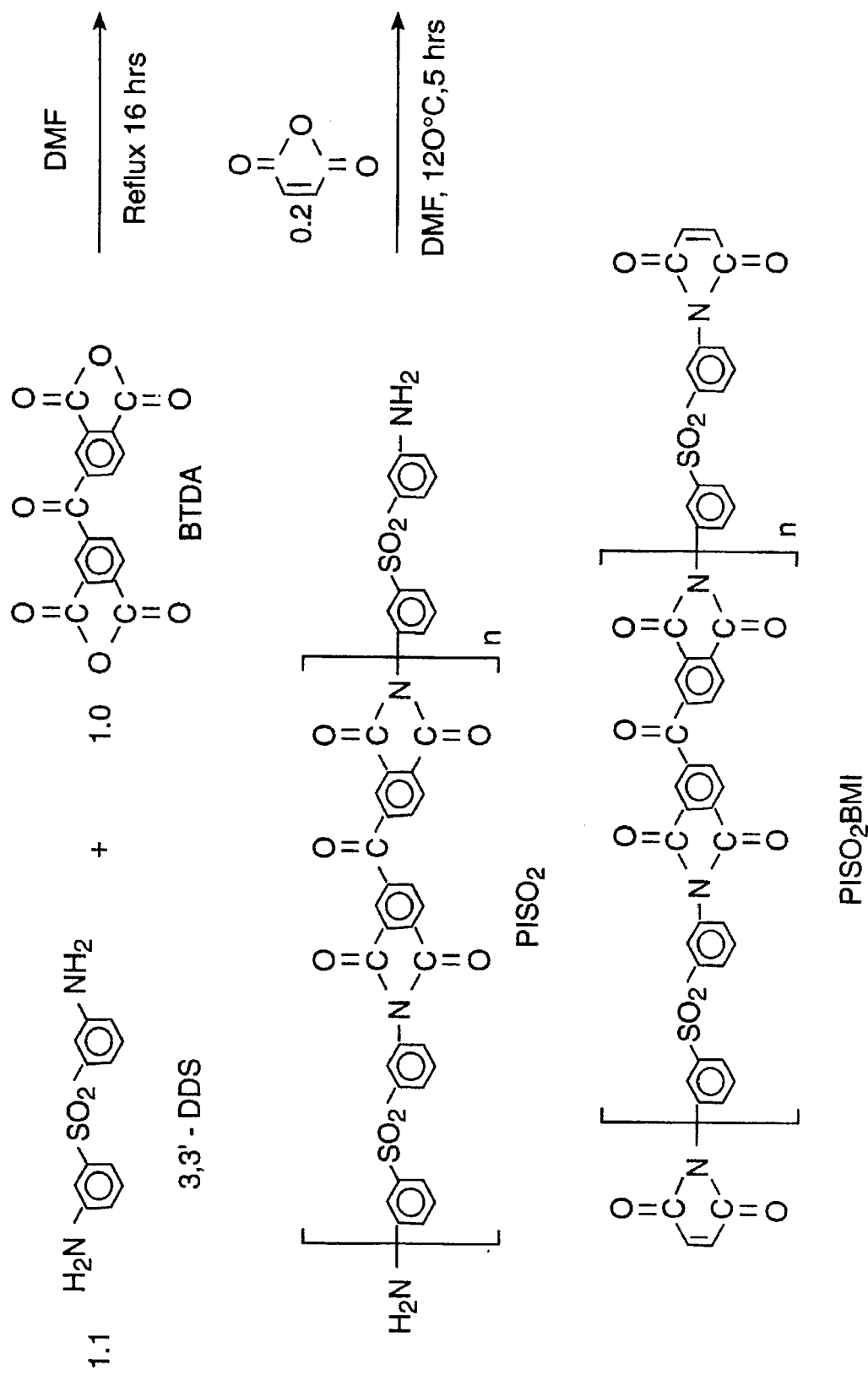
FIG. 12 shows the preparation of reactive endcapped polyimidesulfone (PISO$_2$ BMI)
Figure 13:
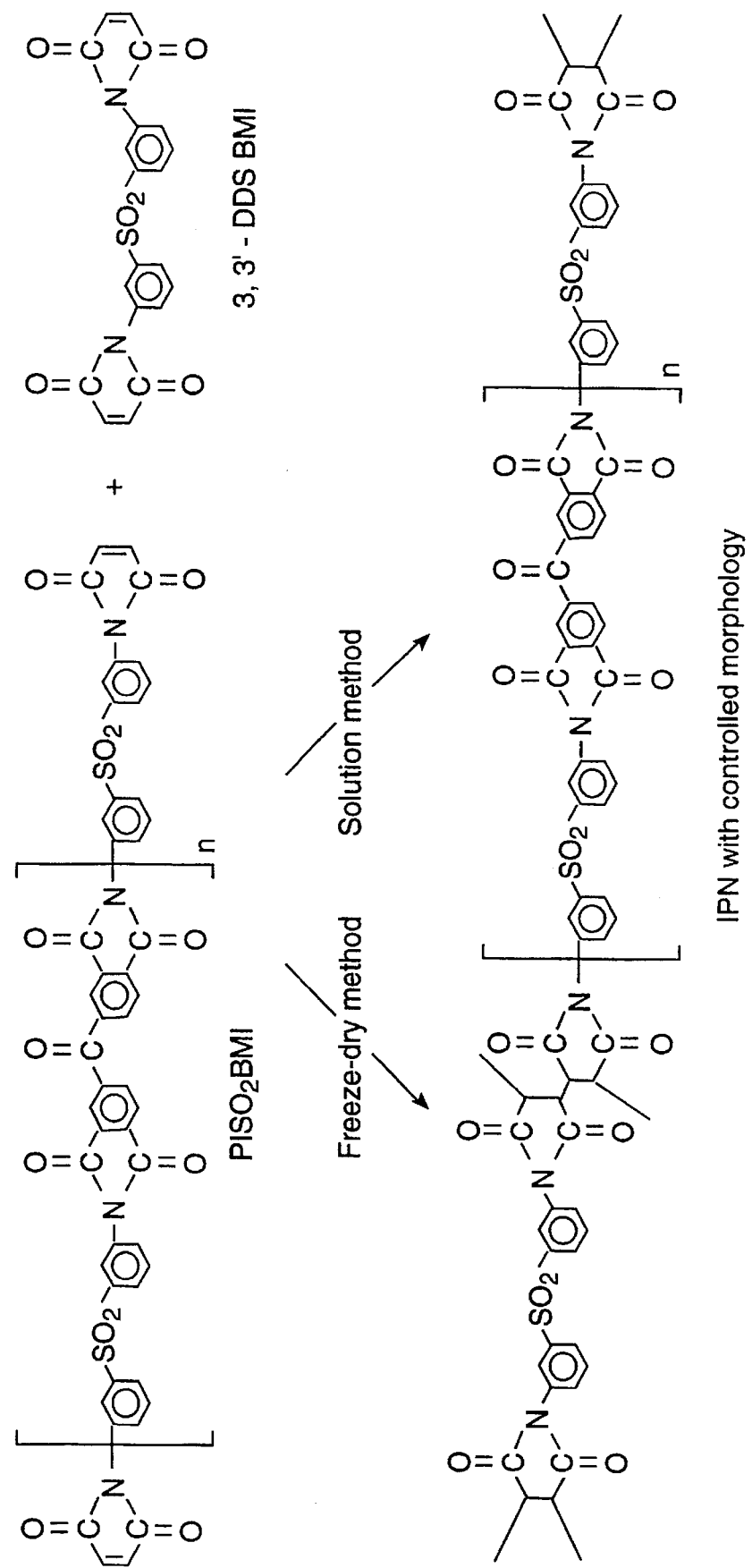
FIG. 13 shows the synthesis of a full IPN from 3,3'-DDS BMI and PISO$_2$ BMI.

Polyimidesulfone ($PISO_2$) thermoplastic endcapped with reactive maleimide ($PISO_2$ BMI) was prepared as shown in FIG. 12. This $PISO_2$ BMI (25% by weight) was allowed to crosslink in the immediate presence of 3,3'-DDS BMI oligomer (75% by weight) obtained from a commercial source (Aldrich) which was also undergoing crosslinking either with itself or with the PISO2 BMI constituent. FIG. 13 illustrates the synthesis of this full IPN.

A-1. Neat Resin Preparation via Freeze-Drying Process

BTDA (60.0 g, 0.1862 mole) was added into a solutin of 3,3'-DDS (50.9 g, 0.2048 mole) in 260.0 g of DMF. The solution was refluxed for 16 hours and MA (2.0 g, 0.01862 mole) was added and the solution continuously refluxed for another 5 hours. After cooling to room temperature, the solution was poured into distalled water and the mixture was mechanically blended. The solids were washed with distilled water, filtered, dried at 100° C. in a vacuum oven for 3 hours to yield $PISO_2$ BMI powder. Commercially obtained 3,3'-DDS BMI oligomer (9.0 g, 75%) and the $PISO_2$ BMI powder (3.0 g, 25%) prepared above were dissolved into 1,3,5-trioxane (28.0 g) preheated to 60° C. The hot solution was cast onto a cold glass plate. This glass plate with solidified solution on it was put into a vacuum oven. The solvent was sublimed (or freeze dried), while the solid was held at 30° C. for 6 hours and then at 50° C. for 5 hours in a vacuum oven. The freeze-dried material was staged at 150° C. for 1 hour in air and then cured at 250° C. for 1 hour under 7.08 MPa pressure. TMA analysis of the resultant neat resin showed a $T_g$ at 248° C. After postcuring the resin at 288° C. for 4 hours in air, the $T_g$ was increased to 267° C. TGA analysis of the neat resin showed no detectable weight loss due to residual trioxane in the cured material. Further, an extensive optical and scanning electron microscopy study confirmed that there was no detectable phase separation in the neat resin.

A-2. Neat Resin Preparation via Solution Method

A control experiment, or traditional method of preparing an IPN, was also carried out by dissolving the same constituents in DMAc. The melting point of DMAc is –20° C. and the boiling point is 165° C. The DMAc soltution was dried by evaporating off the solvent at 150° C. for 3 hours in a vacuum oven. The cure cycle for the solution processed neat resin was the same as that of the freeze-dried-processed material. TMA analysis of the neat resin showed a $T_g$ at 230° C. before posturing and a $T_g$ at 249° C. after postcuring at 288° C. for 4 hours. These $T_g$s are consistently 19° C. lower than the $T_g$s for the freeze dried processed neat resin presented previously.

B. Composite Fabrication

B-1. Composite Fabrication via Freeze-Drying Process

As in Example 6 A-1, the $PISO_2$ BMI powder (25%) and BMI oligomer (75%) were dissolved in 1,3,5-trioxane, which was preheated to 60° C., to afford a red-brown colored solution having 30% by weight resin solids. The resin pot and die, wet-out pins and fiber-lay-down wheel were held at 80° C. and the aluminum winding drum was at ambient temperature. The hot resin solution was used to impregnate unsized Celion 6K graphite fibers. The prepreg was freeze-dried and then B-staged at 150° C. for 1.5 hours. A 12-ply unidirectional composite was made by curing the prepreg at 288° C. for 1 hour under 3.45 MPa (500 psi) pressure. It was observed from both optical and SEM microscopic examinations that the open cell micro-porous foam, in the prepreg after freeze drying, melted and formed a bubble-free coating on the graphite fibers during B-staging. Dynamic mechanical analysis determined on a Rheometrics System IV showed the $T_g$ by loss modulus to be 266° C.

B-2. Composite Fabrication via Solution Method

Reactants of the same composition used in making the freeze-drying processed composite were dissolved in DMAc to give a clear red solution containing 40% by weight solid concentration. The cure cycle for the solution processed composite was the same as the cure cycle for the freeze-drying processed counterpart. The C-scan of the solution processed composite was not as good as that of the freeze-dried. Consequently, the dynamic mechanical properties for the solution processed material were significantly lower than those for the freeze-dried counterpart. Also, the $T_g$ determined by loss modulus was 196° C. which was nearly 70° C. lower than the $T_g$ of the freeze-dried composite (267° C.) mentioned earlier.

What is claimed as new and desired to be secured by Letters Patent of the United States is:

1. A high performance IPN comprising two bismaleimides, wherein one of the bismaleimide components is prepared from the following monomer reactants:

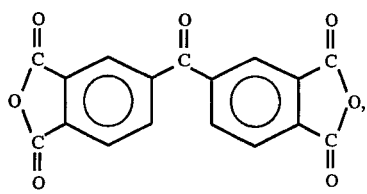

BTDA

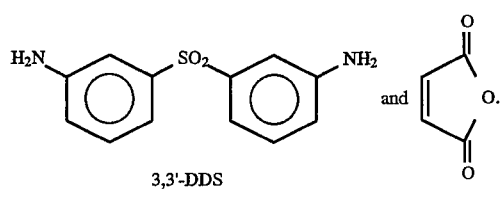 and 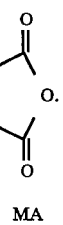

3,3'-DDS                    MA

2. A high performance IPN comprising two bismaleimides, wherein one of the bismaleimide components is prepared from the following monomer reactants:

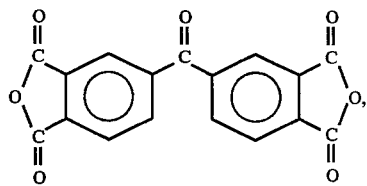

BTDA

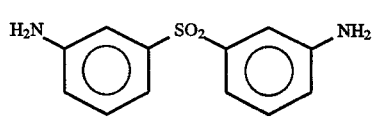 and 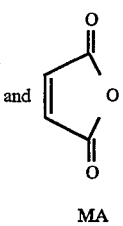

3,3'-DDS                    MA and the monomeric form of the other bismaleimide component has the following structure:

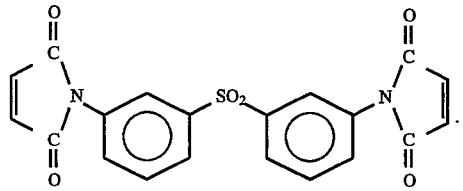

3,3'-DDS BMI

3. A polymer matrix composite comprising the high IPN of claim 1.

4. A polymer matrix composite comprising the high performance IPN of claim 2.

5. A molding compound comprising the high performance IPN of claim 1.

6. A molding compound comprising the high performance IPN of claim 2.

7. An adhesive composition comprising the high performance IPN of claim 1.

8. An adhesive composition comprising the high performance IPN of claim 2.

* * * * *